United States Patent [19]

Morishita

[11] Patent Number: 5,556,554
[45] Date of Patent: Sep. 17, 1996

[54] WIRE-CUT ELECTRICAL DISCHARGE MACHINE AND METHOD WHICH AUTOMATICALLY CALCULATES THE SHAPE, NUMBER AND ARRANGEMENT OF BRIDGING MEMBERS

[75] Inventor: Hiroaki Morishita, Aichi, Japan

[73] Assignee: Mitsubishi Denki Kabushiki Kaisha, Tokyo, Japan

[21] Appl. No.: 377,091

[22] Filed: Jan. 23, 1995

[30] Foreign Application Priority Data

Jul. 7, 1994 [JP] Japan .................................. 6-156020

[51] Int. Cl.$^6$ .............................. B23H 1/00; B23H 7/02
[52] U.S. Cl. ........................................................ 219/69.12
[58] Field of Search .......................... 219/69.12, 69.17; 83/167, 651.1, 375, 380; 204/206, 224 M; 364/474.04

[56] References Cited

U.S. PATENT DOCUMENTS 4,544,819  10/1985  Nomura et al. ...................... 219/69.12
5,015,814   5/1991  Morishita ............................ 219/69.12
5,242,555   9/1993  Buhler ................................. 219/69.12

FOREIGN PATENT DOCUMENTS 61-61718    3/1986  Japan ................................. 219/69.17
63-105822   5/1988  Japan ................................. 219/69.12
63-127829   5/1988  Japan ................................. 219/69.12
3-117519    5/1991  Japan ................................. 219/69.13

Primary Examiner—Geoffrey S. Evans
Attorney, Agent, or Firm—Sughrue, Mion, Zinn, Macpeak & Seas

[57] ABSTRACT

A method and apparatus for wire-cut electrical discharge machining which allows bridging members for securing a core to a workpiece after cutting to be fitted, without interference with adjacent cores, to ensure efficient machining when multiple cores are to be removed from a single workpiece. The disclosed procedure permits machining which can automatically avoid interference of bridging members with an upper nozzle and can automatically perform efficient machining up to finishing.

20 Claims, 12 Drawing Sheets

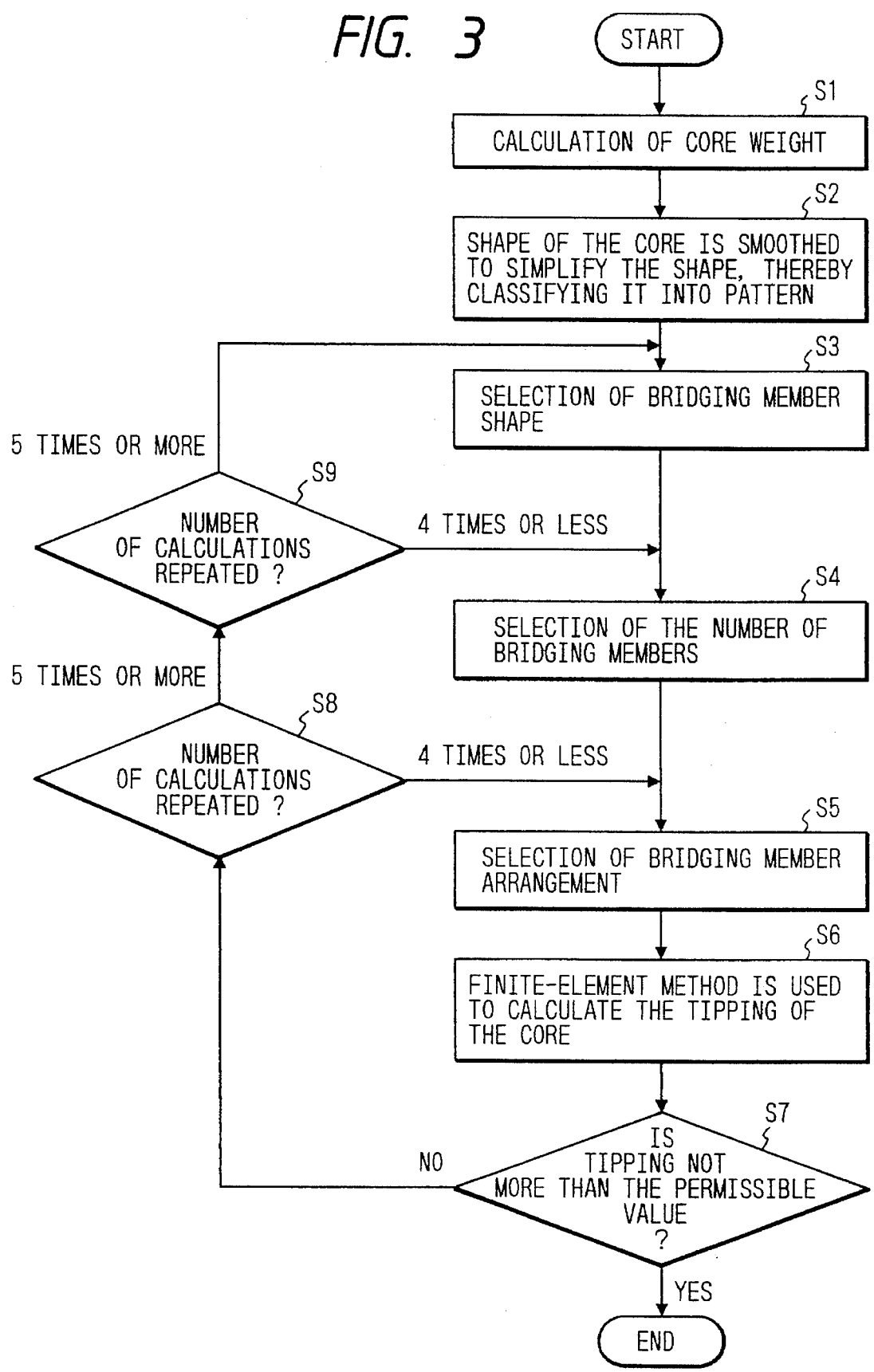

5,556,554

WIRE-CUT ELECTRICAL DISCHARGE MACHINE AND METHOD WHICH AUTOMATICALLY CALCULATES THE SHAPE, NUMBER AND ARRANGEMENT OF BRIDGING MEMBERS

BACKGROUND OF THE INVENTION

1. Field of the Invention

The present invention relates to a method and apparatus for wire-cut electrical discharge machining and particularly to a method and apparatus for handling a core formed by cutting a workpiece into a contour shape.

2. Description of the Background Art

FIG. 19 is a conventional wire-cut electrical discharge machining apparatus described in Japanese Laid-Open Patent Publication No. 57-201127, wherein a workpiece 1 is machined by a wire electrode (hereinafter referred to as the "wire 2"). An upper nozzle 3 locates the wire 2 above the workpiece 1, and a lower nozzle 4 locates the wire 2 under the workpiece 1. As a result of the machining of a core which is to be cut off from the workpiece 1 by the wire 2, a machined groove 6 is formed between the workpiece 1 and a core 5. A bridging member 10 which spans the machined groove 6 is used to keep the core 5 unseparated from the workpiece 1. A bridging device 11 is used to transfer the bridging member 10.

In operation, a voltage is applied between the workpiece 1 and the wire 2 by a machining power supply, not shown, and generates a discharge. The wire 2 is positioned proximate to the workpiece 1 by the upper nozzle 3 and the lower nozzle 4. The workpiece 1 and the wire 2 are moved relative to each other under a command from an NC apparatus, not shown, to cut the workpiece 1 into a predetermined contour shape, whereby the core 5 is formed as the groove 6 is machined between the core 5 and the workpiece 1. Immediately before cutting off is complete, machining is stopped once and the bridging device 11 is activated to bond the bridging member 10 to the core 5 and the workpiece 1 across the machined groove 6. After the bridging is secure, the "portion left for cutting" is machined.

The conventional electrical discharge machining apparatus constructed as described above has a problem that the core may tip or shift after cutting, depending on the shape and/or size of the core 5 or the fitting method of the bridging members 10.

Also, the conventional electrical discharge machining apparatus has a problem that when multiple cores are to be removed from one workpiece 1, the bridging member 10 will interfere with an adjacent machining area especially when the cores 5 are small, disallowing next machining. Further, if the bridging member 10 has been arranged to prevent interference, the number of cores removable from the workpiece 1 will be smaller, resulting in lower efficiency.

Another problem faced by the conventional electrical discharge machining apparatus is that the bridging member 10 may interfere with the upper nozzle 3 depending on the size of the core 5 or the size or fitting positions of the bridging members 10.

A related problem is that finishing cannot be performed efficiently.

SUMMARY OF THE INVENTION

It is accordingly an object of the present invention to overcome such problems by providing a method and apparatus for wire-cut electrical discharge machining which allows any shape of cores to be securely held to a workpiece.

It is another object of the present invention to provide a method and apparatus for wire-cut electrical discharge machining which allows bridging members to be fitted, without interference with adjacent cores, to ensure efficient machining when multiple cores are to be removed from a single workpiece.

It is another object of the present invention to provide a method and apparatus for wire-cut electrical discharge machining which can automatically avoid interference of bridging members with an upper nozzle.

It is a further object of the present invention to provide a method and apparatus for wire-cut electrical discharge machining which can automatically perform machining up to finishing.

BRIEF DESCRIPTION OF THE DRAWINGS

FIG. 3 is a flowchart illustrating the operation of the wire-cut electrical discharge machining apparatus concerned with Embodiment 1.

DESCRIPTION OF THE PREFERRED EMBODIMENTS

Embodiment 1

Figure 1:
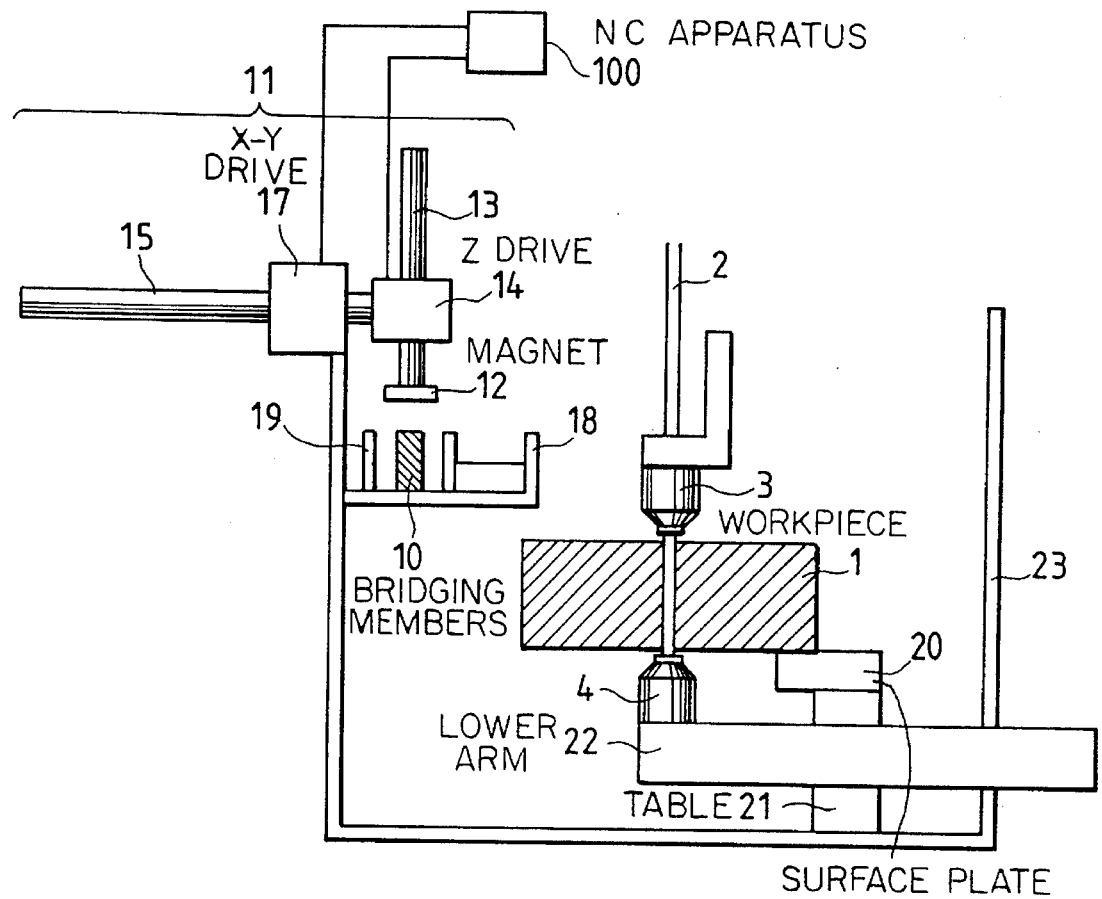
FIG. 1 is a side view illustrating the arrangement of a wire-cut electrical discharge machining apparatus concerned with Embodiment 1.

Embodiment 1 of the present invention may be described with reference to FIGS. 1 to 7, wherein identical reference characters to those in the conventional example designate identical or corresponding parts.

Figure 2:
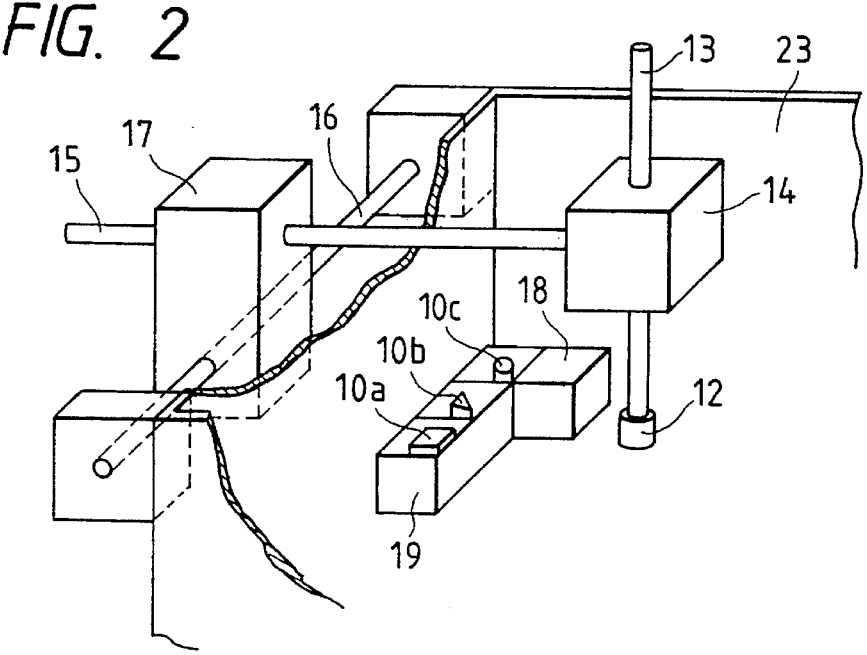
FIG. 2 is a perspective view illustrating the arrangement of the wire-cut electrical discharge machining apparatus concerned with Embodiment 1.
Figure 6:
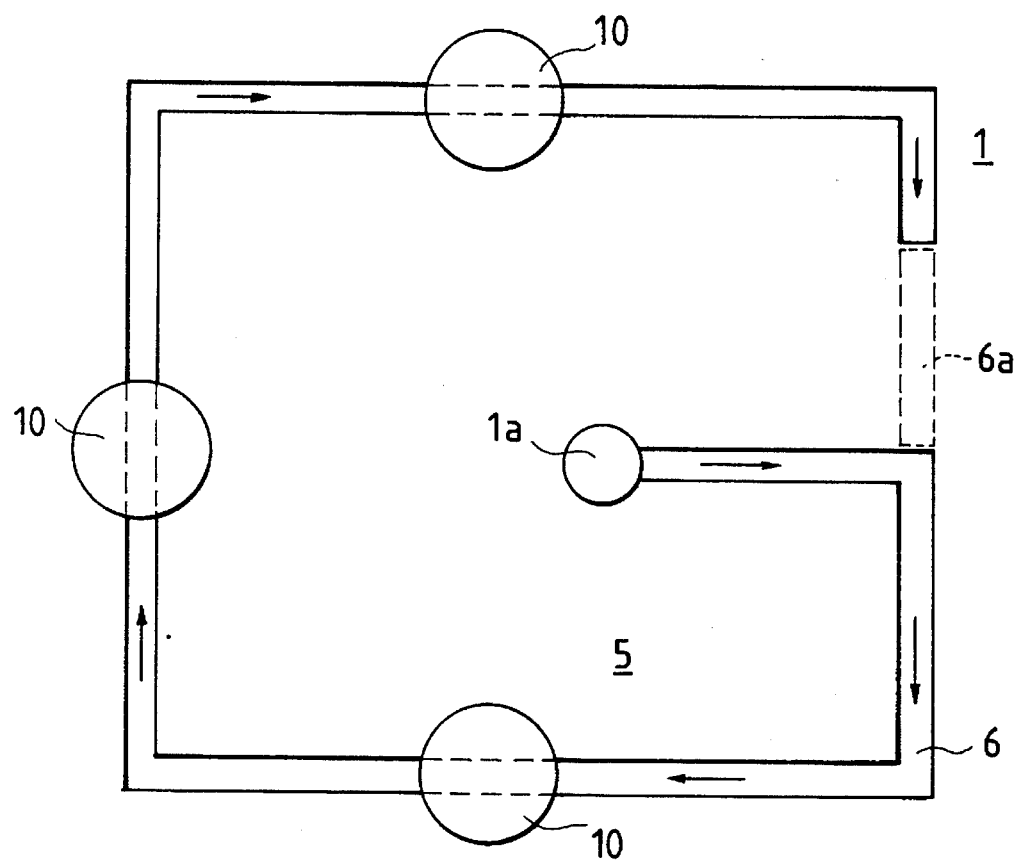
FIG. 6 is a diagram illustrating the fitting of bridging members concerned with Embodiment 1.

Referring first to FIG. 6, an initial hole 1a is first cut in the workpiece 1 and as machining proceeds, a groove 6 is formed until there is a small portion 6a which is left for cutting. Bridging members 10, which are made of a strong magnetic material to hold the core 5 to the workpiece 1, are selectively applied across the groove 6 at selected locations. The bridging member 10 may be circular or, as seen in FIG. 2, a rectangular parallelepiped 10a, a triangular bridging member 10b, or a cylindrical bridging member 10c. A bridging device 11 consists of several parts including a magnet 12 which transfers the bridging member 10, a quill (Z) 13 which supports the magnet 12 to guide it through vertical movement, a (Z) drive which drives the quill (Z) 13, a quill (X) which guides the magnet 12 through longitudinal movement 15, a quill (Y) 16 which guides the magnet 12 through transverse movement, and an XY drive 17 which drives the quill (X) 15 and the quill (Y) 16.

As seen in FIG. 1, other relevant structures include an NC apparatus 100 which controls the XY drive 17 and the (Z) drive 14 and also controls the wire-cut electrical discharge machining apparatus. An adhesive bath 18 stores an adhesive for application to the bridging members 10 and a bridging member stocker 19 is used for stocking the bridging members 10. A surface plate 20 holds the workpiece 1, and a table 21 secures the surface plate 20. A lower arm 22 holds the lower nozzle 4, and a machining bath 23 is designed to secure the table 21 and prevent dielectric from splashing.

In operation, the wire 2 is passed into the initial hole 1a to cut the workpiece 1 into a predetermined shape. Machining is stopped temporarily with the predetermined portion left for cutting 6a as shown in FIG. 6. Then, the shape and the number of the bridging members 10 are selected and their positions are calculated in accordance with the flowchart in FIG. 3.

Figure 4A:
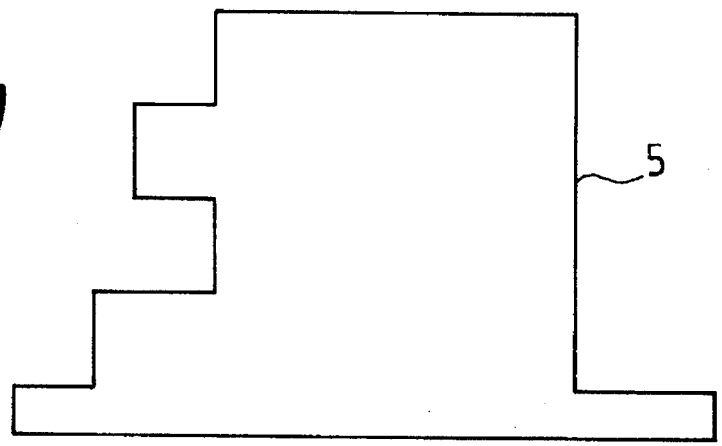
FIGS. 4(a) and 4(b) illustrate the smoothing of a machined shape concerned with Embodiment 1.
Figure 4B:
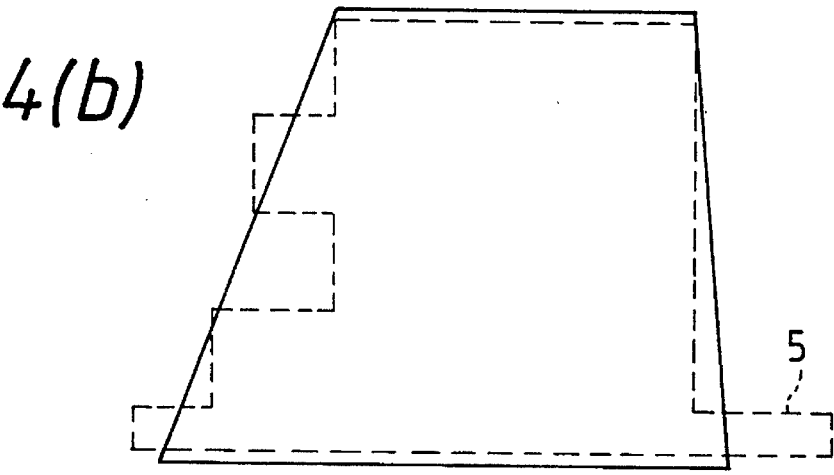
Figure 5:
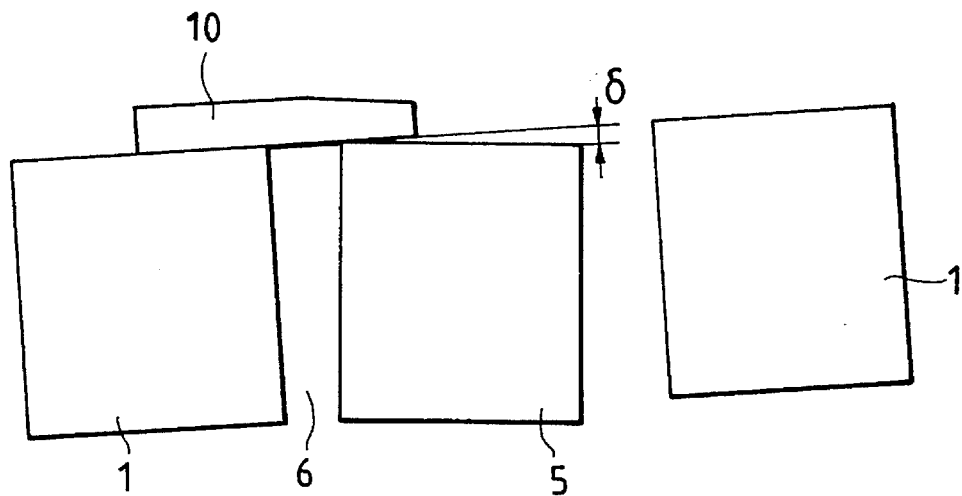
FIG. 5 is a diagram illustrating the tipping of a core concerned with Embodiment 1.

It is to be understood that the selection and calculation are performed by the NC apparatus 100. According to the sequence of steps illustrated in FIG. 3, the weight of the core 5 is first calculated (S1). This calculation is made from the machined shape, plate thickness and material of the workpiece 1 which have been entered before electrical discharge machining. Subsequently, the core 5 is smoothed into the smoothest possible shape as shown in FIG. 4 so that the shape of the core is classified into a predetermined pattern (S2). By way of example, an actual core shape is shown in FIG. 4(a) and a smoothed core shape is shown in FIG. 4(b). The shape of the bridging member 10 is selected according to the pattern, shape area (calculated from machining path data entered before electrical discharge machining), weight, and the like of the core (S3) and the number and fitting positions of the bridging members 10 are determined temporarily (S4, S5). On the assumption that the bridging members 10 temporarily determined as described above are fitted across the core 5 and the workpiece 1 and cutting off or finishing is performed, the tipping of the core 5 due to the pressure of the dielectric injected from the upper nozzle 3 and the lower nozzle 4 and the tipping of the core 5 by its own weight are calculated (S6). Then it is judged whether the tipping calculated at this time does not exceed a predetermined value (S7). It is to be understood that for the calculation of tipping, the finite-element method is used to calculate elastic deformation and the maximum deflection 6 of the core is found, as shown in FIG. 5.

If it has been judged at step S7 that the tipping is greater than the permissible value, the fitting positions, number and shape of the bridging members 10 are changed in sequence to determine the optimum arrangement of the bridging members 10.

If it has been judged at step S7 that the tipping is greater than the permissible value, the fitting positions of the bridging members 10 are first changed (S5) and the calculations at steps S6 are made. If it is judged again at step S7 that the tipping is greater than the permissible value, steps S5 to S7 are repeated. It is to be noted that the number of calculations made at step S6 is counted at step S8 and steps S5 to S7 are repeated until the number of calculations at S6 reaches four.

If it is judged at step S7 that the tipping is still larger than the permissible value after the fitting positions of the bridging members 10 have been changed four times, the number of the bridging members 10 is changed (S4) and steps S5 to S7 are then carried out. If it is judged again at step S7 that the tipping is greater than the permissible value, steps S5 to S7 are repeated three more times for the new number of bridging members 10 set at step S4. If it is judged at step S7 that the tipping is still larger than the permissible value after the fitting position changing has been made four times for the new number of the bridging members 10 set at step S4, the number of the bridging members 10 is changed again (S4) and steps S5 to S7 are then repeated four times. It is to be noted that the number of calculations made at step S4 is counted at step S9 and the steps S4 to S7 are repeated until the number of calculations at step S4 reaches four.

Also, if it is judged at step S7 that the tipping is still larger than the permissible value after the fitting positions and number of the bridging members 10 have been changed, the shape of the bridging members 10 is changed (S3) and the steps S4 to S7 are then carried out. If it is judged again at step S7 that the tipping is greater than the permissible value, steps S5 to S7 are repeated three more times for the new shape of the bridging members 10 set at step S3. If it is judged at step S7 that the tipping is still larger than the permissible value after the fitting position changing has been made four times for the new shape of the bridging members 10 set at step S3, the number of the bridging members 10 having the new shape set at step S3 is changed (S4) and steps S5 to S7 are then repeated four times. It is to be noted that the number of calculations made at step S4 is counted at step S9 and steps S4 to S7 are repeated until the number of the calculations at step S4 reaches four. If it is judged at step S7 that the tipping is still larger than the permissible value after steps S4 to S7 have been repeated as described above for the new shape, the shape of the bridging members 10 is changed again (S3) and steps S4 to S7 are then repeated as described above. It is to be understood that the shape of the bridging members 10 is changed by the number of shapes of the bridging members 10 stocked in the bridging member stocker 19 (entered beforehand in the NC apparatus).

By repeating these steps as described, the optimum arrangement of the bridging members 10 can be determined. However, if the optimum arrangement of the bridging members 10 cannot be determined by repeating these steps, an error occurs (not shown). In this case, the above operation will be repeated after the operator has changed the types of the bridging members 10 stocked in the bridging member stocker 19, for example.

Figure 7:
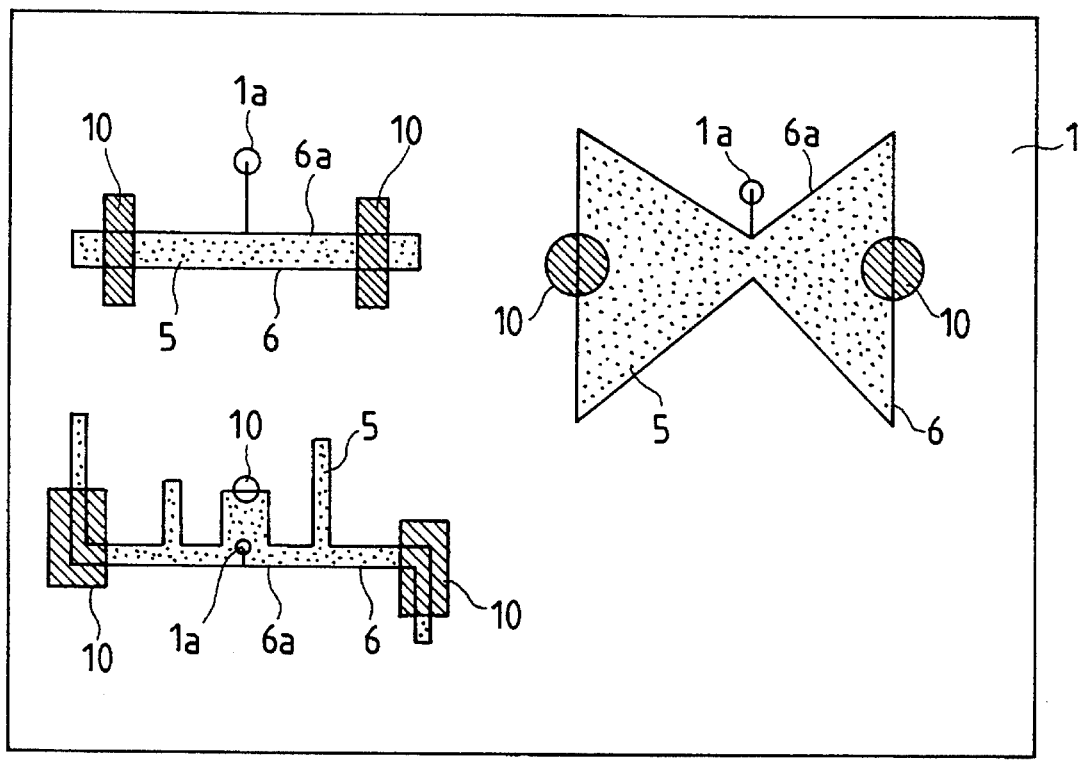
FIG. 7 is a diagram illustrating bridging member fitting variations concerned with Embodiment 1.

An example of the arrangement of the bridging members 10 used after following this procedure is shown in FIG. 7. The bridging members 10 are fitted across the workpiece 1 and the core 5 by the bridging device 11. Specifically, the XY drive 17 and the Z drive 14 are activated by the NC apparatus 100, and the corresponding bridging member 10 is selected from those within the bridging member stocker 19 and attracted to the magnet 12. Then, the bottom of the bridging member 10 is dipped into the adhesive in the adhesive bath 18. Subsequently, the bridging member 10 is fitted to the predetermined position. The portion left for cutting 6a is then cut and machining is terminated.

It is to be understood that the finite-element method used to calculate the tipping of the core may be the other solution such as the boundary element method or a method in which the tipping is approximate.

Embodiment 2

Figure 8:
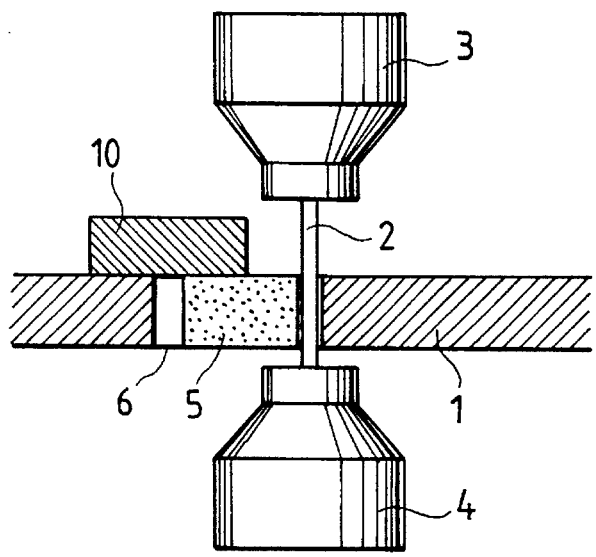
FIG. 8 is a diagram illustrating the operation of a wire-cut electrical discharge machining apparatus concerned with Embodiment 2.
Figure 9:
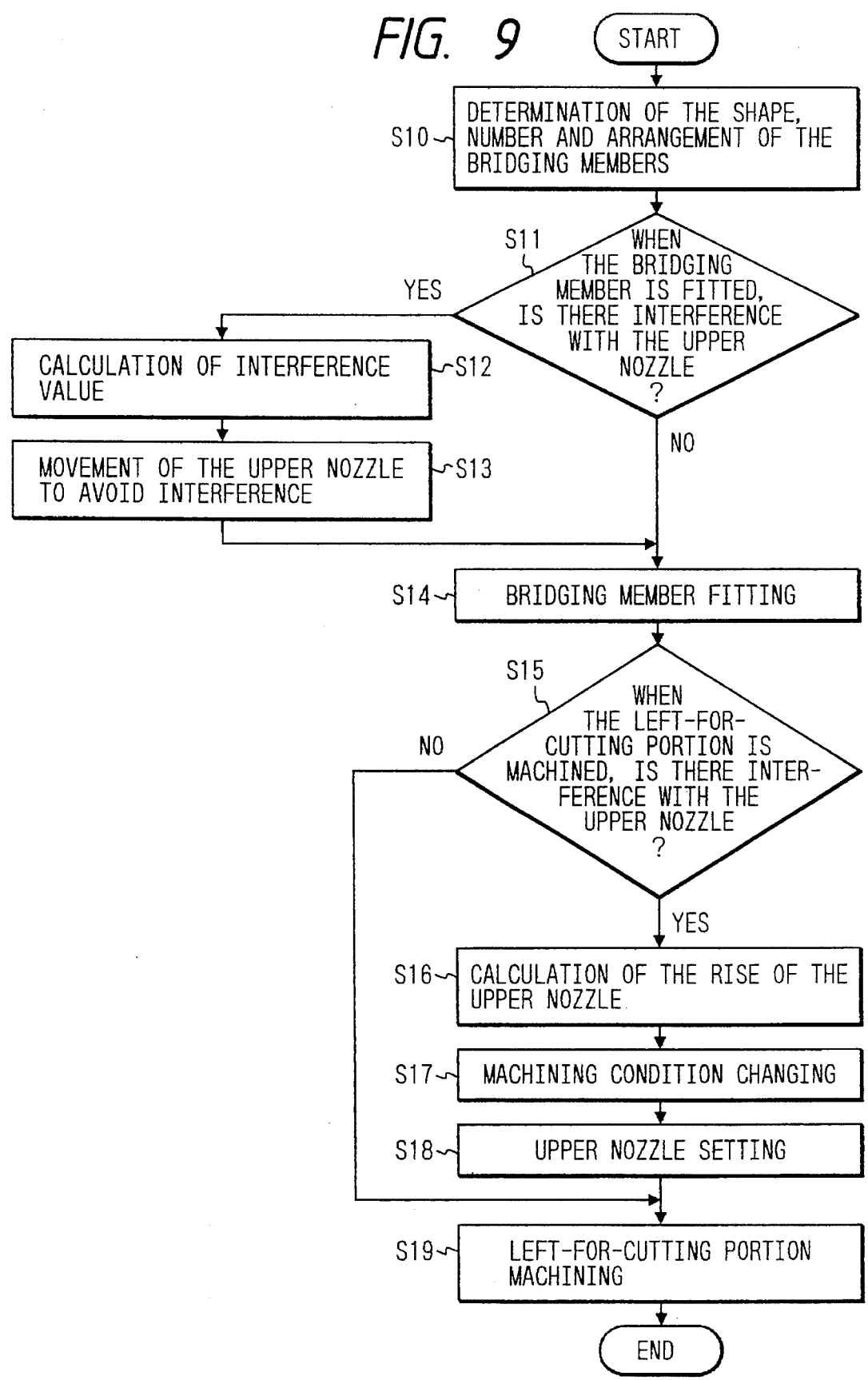
FIG. 9 is a flowchart illustrating the operation of the wire-cut electrical discharge machining apparatus concerned with Embodiment 2.

Embodiment 2 of the present invention will now be described with reference to FIGS. 8 and 9. It is to be understood that the mechanical structure and partway operation of the apparatus is identical to that in Embodiment 1. FIG. 8 illustrates the operation of the present embodiment, and FIG. 9 is a flowchart describing that operation. Also, in FIG. 8, identical reference characters to those in the drawings of Embodiment 1 indicate identical or corresponding parts.

Operation will now be described. If the left-for-cutting portion 6a is close to the fitting position of the bridging member 10 in Embodiment 1 especially when the core 5 is small, the upper nozzle 3 may interfere with the bridging member 10 when the bridging member 10 is fitted or when the left-for-cutting portion 6a is machined. Hence, the upper nozzle 3 must move clear of the bridging member 10 as shown in FIG. 8. Such operation will be described in accordance with the flowchart in FIG. 9.

The present embodiment represents an operation performed at and after the step of bonding the bridging member 10 across the workpiece 1 and the core 5 in FIG. 8 in Embodiment 1. First, the shape, number and fitting positions of the bridging members 10 are determined as described in Embodiment 1 (S10). Then, a check is performed for interference between the corresponding bridging member 10 and the upper nozzle 3 at the time of fitting the bridging member 10 (S11), and if they seem to interfere, a direction and an interference value are calculated (S12) and the upper nozzle 3 moves clear of the bridging member 10 (S13). Since the XYZ drive of the upper nozzle 3 is already known, it will be fully understood without any explanation.

Then, the bridging members 10 are fitted (S14). Subsequently, when the left-for-cutting portion is to be machined, the upper nozzle 3 is moved to judge whether it interferes with the corresponding bridging member 10 (S15). If they seem to interfere, an interference value between the bridging member 10 and the upper nozzle 3 is found and a rise required for the upper nozzle 3 is calculated (S16), the settings of machining conditions are changed since a machining status will change due to the rise of the upper nozzle 3 (S17), and the upper nozzle 3 is raised (S18). Then, the left-for-cutting portion is machined (S19).

To calculate the interference value, the stroke origin of the electrical discharge machining apparatus is defined as (0, 0, 0) and the positions of the workpiece 1, the bridging member 10 and the upper nozzle 3 are recognized in three-dimensional coordinates.

Since the left-for-cutting portion 6a is usually approximately several mm in length when the upper nozzle 3 interferes with the bridging member 10 at the time of machining the left-for-cutting portion, the upper nozzle 3 was raised at the start of machining the left-for-cutting portion in the present embodiment. However, if machining speed reduces due to the rise of the upper nozzle 3 or the left-for cutting portion 6a is long because the core 5 that will affect machining accuracy is large, the upper nozzle 3 may be raised immediately before it will interfere with the bridging member 10.

Also, while the interference between the upper nozzle 3 and the bridging member 10 was calculated beforehand to avoid it in the present embodiment, that interference may be detected by a contact detector fitted to the upper nozzle 3 or the bridging member 10 to avoid it in order to produce the same effect.

Embodiment 3

Figure 10:
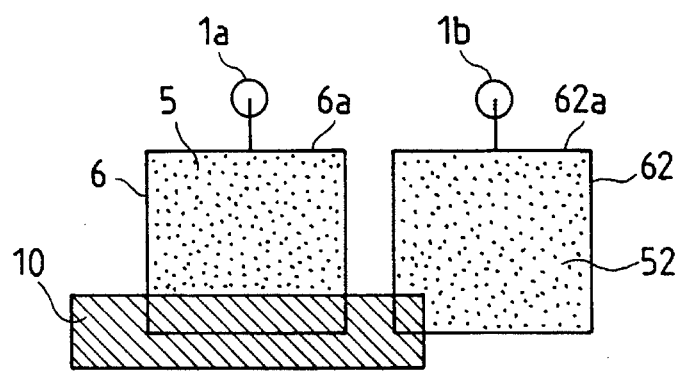
FIG. 10 is a diagram illustrating a bridging member fitting example to describe operation concerned with Embodiment 3.
Figure 11:
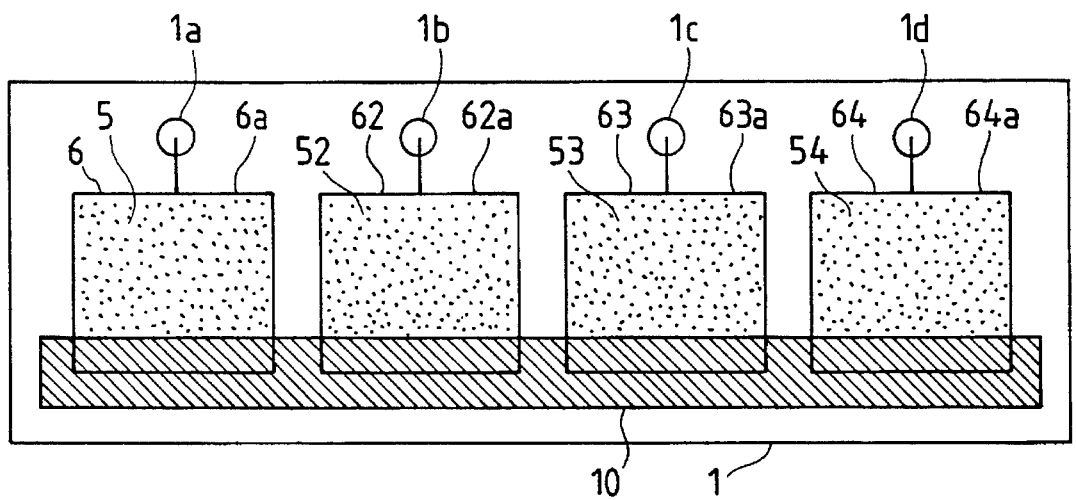
FIG. 11 is a diagram illustrating a bridging member fitting example to describe operation concerned with Embodiment 3.
Figure 12:
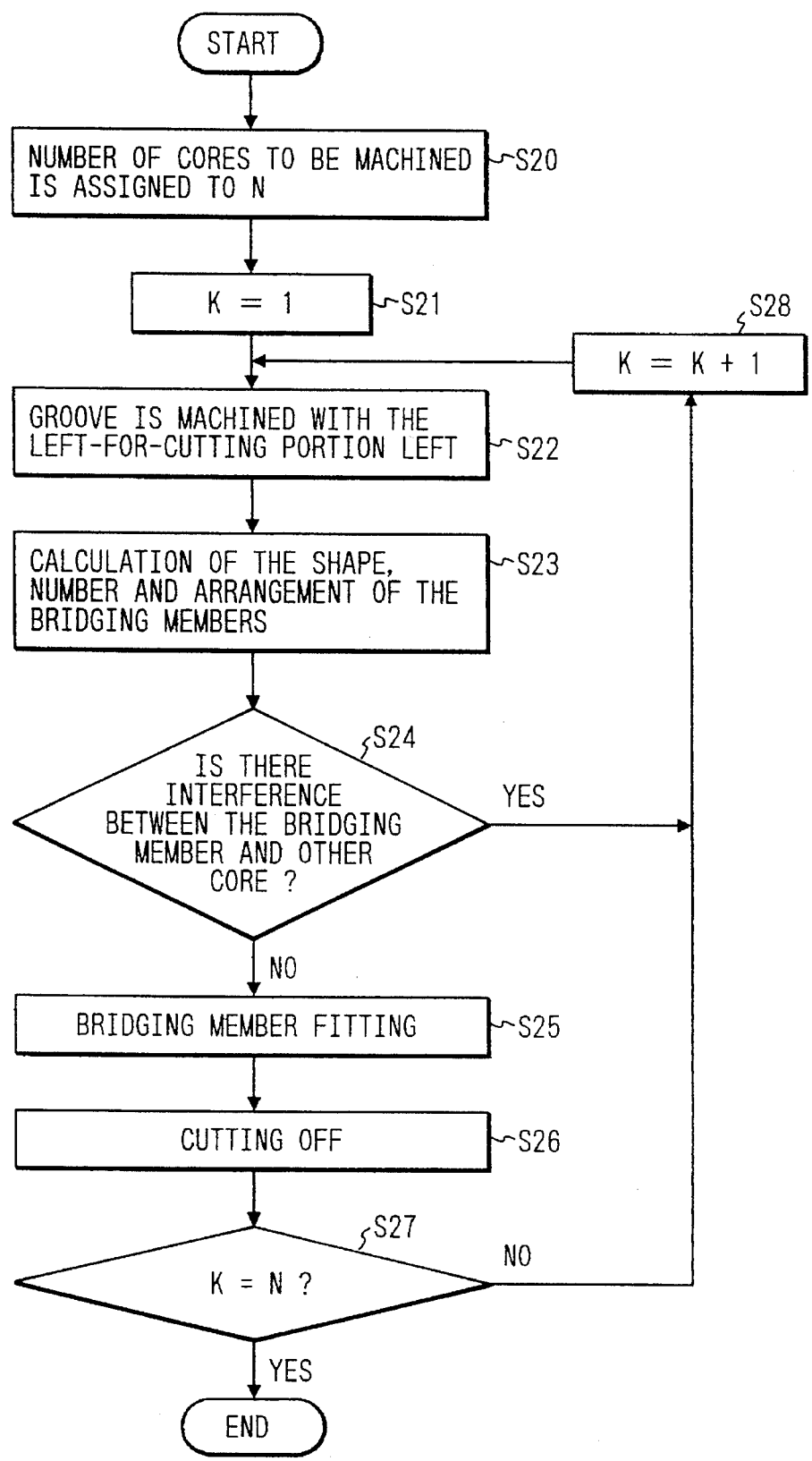
FIG. 12 is a flowchart illustrating the operation of a wire-cut electrical discharge machining apparatus concerned with Embodiment 3.

Embodiment 3 of the present invention will now be described with reference to FIGS. 10 to 12. It is to be understood that the mechanical structure and some operation of the apparatus are identical to those in Embodiments 1 and 2. FIG. 10 is a bridging member fitting diagram for removal of multiple cores adjacent to each other in Embodiment 1, FIG. 11 is a bridging member fitting diagram for a workpiece in the present embodiment, and FIG. 12 is an operation flowchart for these drawings. Also, in the drawings, identical reference characters to those in the drawings of Embodiments 1 and 2 indicate identical or corresponding parts.

In the drawings, 1b indicates an initial hole for second machining, 1c denotes an initial hole for third machining, 1d represents an initial hole for fourth machining, 52 designates a core for the second machining, 53 indicates a core for the third machining, 54 represents a core for the fourth machining, 62 designates a machined groove for the second machining, 63 denotes a machined groove for the third machining, 64 indicates a machined groove for the fourth machining, 62a represents a left-for-cutting portion for the second machining, 63a denotes a left-for-cutting portion for the third machining, and 64a designates a left-for-cutting portion for the fourth machining.

Operation will now be described. When multiple cores adjacent to each other are to be removed from the workpiece 1 in Embodiment 1, the bridging member 10 fitted for the machining of the first core may interfere with the machine groove 62 of the second core as shown in FIG. 10. In such a case, interference between the upper nozzle 3 and the bridging member 10 occurs at the time of machining, damaging the machine. If the interference with the upper nozzle 3 is avoided by the method as in Embodiment 2, a problem will arise, e.g., when the bridging member 10 is to be fitted to hold the second core 52, the bridging members 10 will interfere with each other, disallowing fitting. When spacing between the cores is increased to prevent such interference, the number of cores removable from the workpiece 1 decreases, resulting in lower efficiency. The present embodiment designed to solve such problems will be described in accordance with FIGS. 11 and 12.

Since the number of cores to be machined is four in FIG. 11, N=4 (S20). First, the wire 2 is passed into the initial hole 1a of the first core and machining is carried out with the exception of the left-for-cutting portion 6a to form the machined groove 6 (S22). At this time, it is to be noted that since the first core is to be machined, K (number of cores machined) is counted as 1 (S21). Then, the fitting positions of the bridging members 10 are determined using the logic as in Embodiment 1 (S23). At this time, a check is made for interference between the next core 52 and the bridging member 10 as in FIG. 10 (S24). This interference check can be performed in the same way as in Embodiment 2. Since interference occurs in this case, the operation proceeds to the machining of the next core. At this time, it is to be noted that because the second core is to be machined, K (number of cores machined) is counted as K (previous number of cores machined)+1 (S28).

The wire 2 is passed into the initial hole 1b of the second core and machining is carried out with the exception of the left-for-cutting portion 62a to form the machined groove 6 (S22). Then, the fitting position of the bridging member 10 across the core 5 and the core 52 is determined (S23). Since the bridging member 10 and the next core 53 interfere in this case, the operation proceeds to the machining of the next core. Similarly, at the end of machining the left-for-cutting portion of the third core, the bridging member 10 cannot be fitted and therefore the operation proceeds to the machining of the fourth core. Because the bridging member 10 can be fitted across the four cores 5, 52, 53, 54, the bridging member 10 is fitted as shown in FIG. 11 (S25) and the left-for-cutting portions 6a, 62a, 63a, 64a are machined in sequence (S26). In the present embodiment, the number of cores to be machined is four and the bridging member 10 is fitted at the end of machining the four cores with the exception of the left-for-cutting portions. Hence, K=N (S27) and the machining is terminated.

It is to be noted that if the number of cores to be machined is four and the bridging member 10 can be fitted without interference with the other core at the end of machining two cores with the exception of the left-for-cutting portions, the operation immediately progresses to said steps S25 and S26 and it is judged at step S27 that K=N. Therefore, the operation advances to S28 and steps S22 to S27 are repeated.

Also, if the selected bridging member interferes with the groove of the adjacent core in the present embodiment, the interference check is resumed after the core held by the corresponding bridging member has been machined with the exception of its left-for-cutting portion. However, the present embodiment may be designed to proceed to actual machining after a check has been made for interference between the bridging member selected beforehand and the groove of the adjacent core without actual machining being performed.

Embodiment 4

Figure 13:
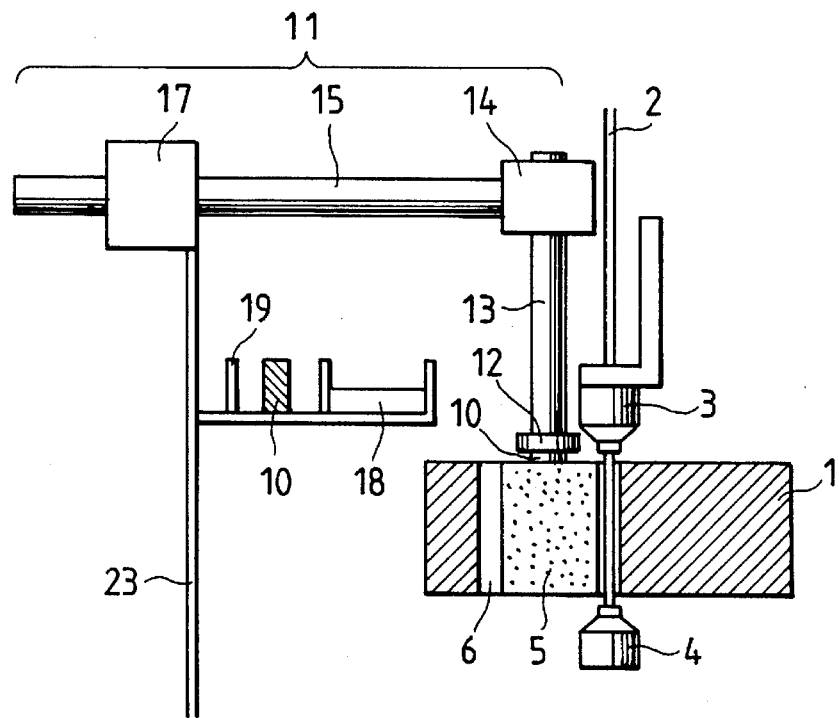
FIG. 13 is a diagram illustrating the way of fitting a bridging member concerned with Embodiment 4.
Figure 14:
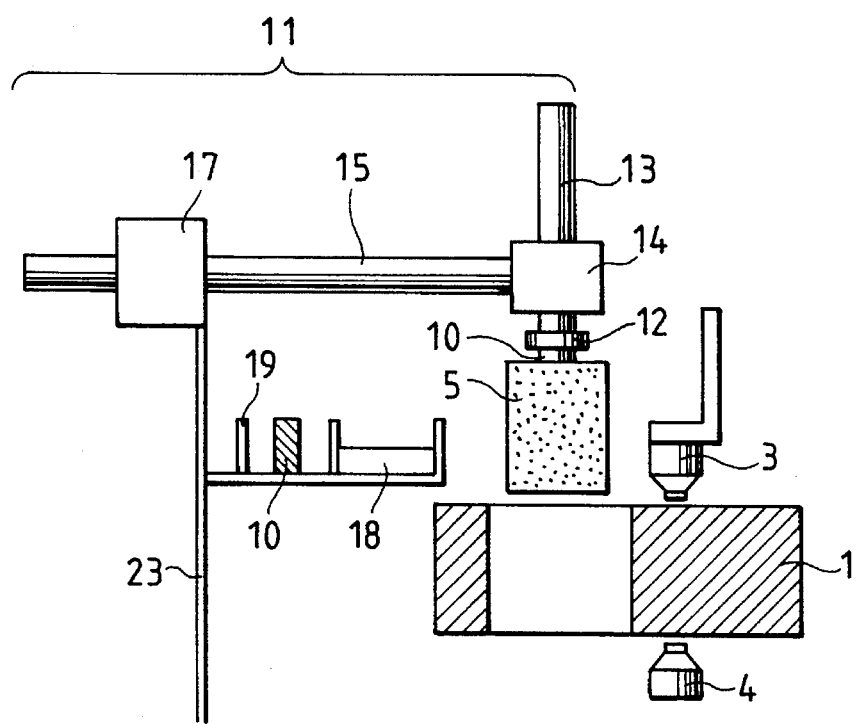
FIG. 14 is a diagram illustrating the way of pulling off a core concerned with Embodiment 4.

Embodiment 4 of the present invention will now be described with reference to FIGS. 13 and 14. It is to be understood that the mechanical structure and some operation of the apparatus are identical to those in Embodiments 1 and 2, FIG. 13 shows how the core is held by the bridging device, and FIG. 14 shows how the core is removed from the workpiece. Also, in the drawings, identical reference characters to those in the drawings of Embodiments 1 and 2 indicate identical or corresponding parts.

Operation will now be described. The bridging member 10, which was fitted across the core 5 and the workpiece 1 in Embodiment 1 before the machining of the left-for-cutting portion, is fitted on only the core 5 in the present embodiment as shown in FIG. 13. Then, while the core 5 is being held by the bridging device 11, the left-for-cutting portion 6a is machined and the core 5 is cut off. Subsequently, as shown in FIG. 14, the wire 2 is cut off, the upper nozzle 3 is moved to the non-interference position, and the Z drive 14 is driven to raise the quill Z 13 to pull up the core 5 from the workpiece 1. Then, the core 5 is transferred to a predetermined position by the bridging device 11 and separated from the magnet 12. At this time, the fitting of the bridging member 10 is set so that the tipping of the core 5 is not more than the permissible value as in Embodiment 1, and a non-interference measure is taken as in Embodiment 2 if the bridging member 10 interferes with the upper nozzle 3 at the time of fitting the bridging member 10 or partway through the machining of the left-for-cutting portion.

It is to be understood that while one bridging device was employed to hold the core in the present embodiment, a plurality of bridging members may be fitted and a plurality of bridging devices used to hold the core to produce the same effect.

Figure 15:
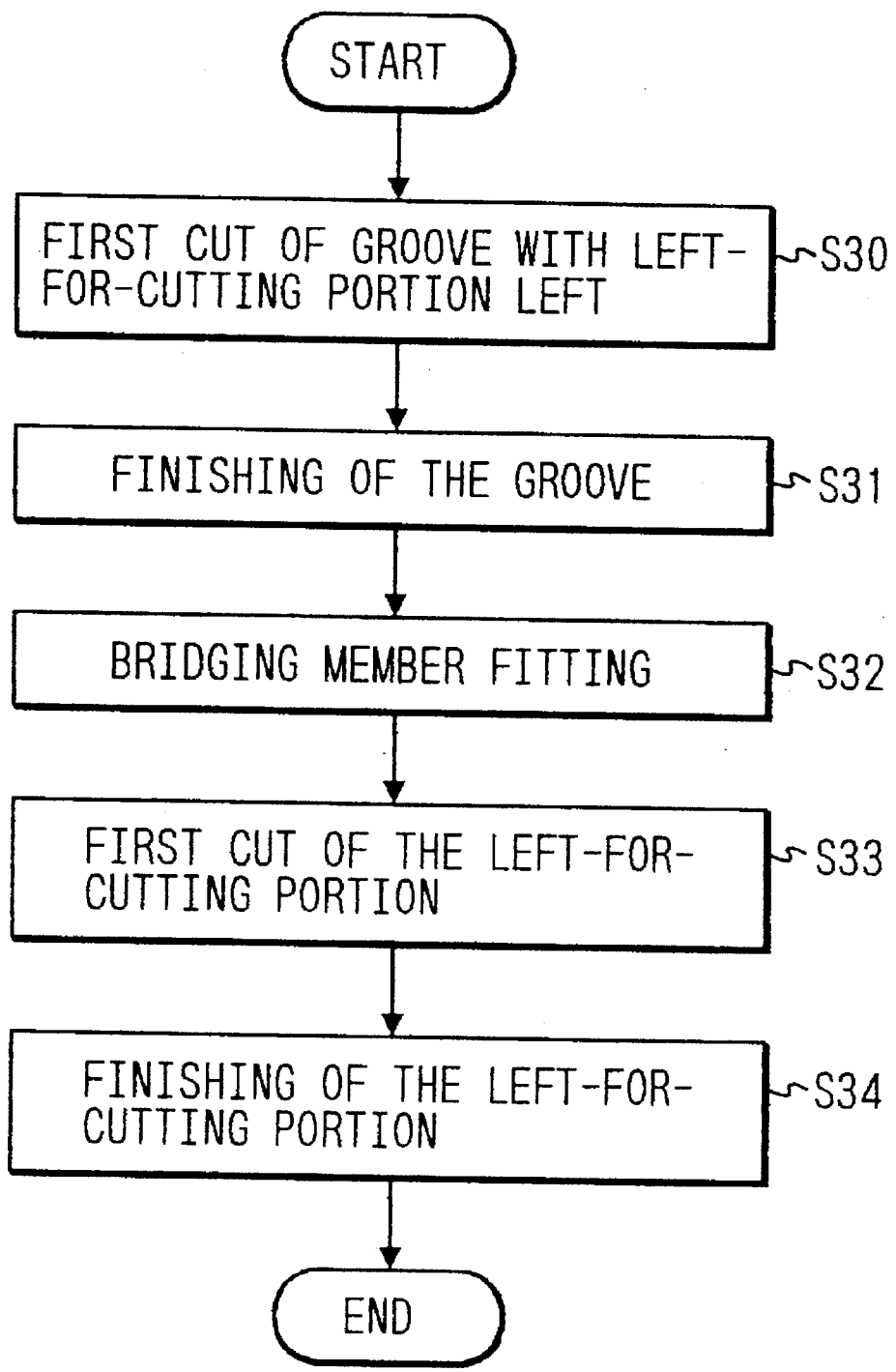
FIG. 15 is a flowchart illustrating the operation of a wire-cut electrical discharge machining apparatus concerned with Embodiment 5.

A further feature of the present invention will now be described in accordance with FIG. 15. The structure of the apparatus is identical to that of Embodiment 1. An operation flowchart concerned with the present invention is shown in FIG. 15.

In the conventional methods for handling the core 5, the core 5 was taken to the outside of the machine and the workpiece, i.e., die, and was finished as described in Japanese Laid-Open Patent Publication No. HEI2-303725. In such method, finishing was performed after punching the core 5. However, if punching the core 5 is to be used on the wire-cut electrical discharge machining apparatus, it was difficult to perform all operations automatically because setup changes had to be made and a workpiece had to be held by a special jig.

The object of the present embodiment is to improve these disadvantages and to permit automatic cutting and finishing. As seen in the flowchart in FIG. 15, first, a first cut is made with the exception of the left-for-cutting portion (S30). Then, the machined portion (first-cut portion) is finished (S31). Subsequently, the bridging members 10 are fitted to hold the core 5 (S32). At this time, the fitting of the bridging members 10 is set so that the tipping of the core 5 is not more than the permissible value as in Embodiment 1, and the non-interference measure is taken as in Embodiment 2 if the bridging member 10 interferes with the upper nozzle 3 at the time of fitting the bridging member 10 or partway through the machining of the left-for-cutting portion. Then, a first cut is made in the left-for-cutting portion (S33). Finally, the left-for-cutting portion is finished (S34).

The above procedure allows machining without requiring setup changes.

In each of the previously described embodiments, the material of the bridging member is not limited to a strong magnetic material, and an electromagnet need not be employed to transfer the bridging member. Any means for holding the core to the workpiece may be used to provide the same effect.

Figure 16:
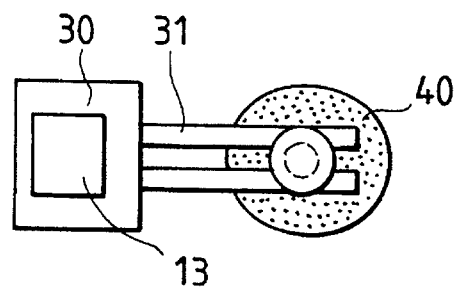
FIG. 16 is a diagram illustrating a bridging member holding state concerned with Embodiment 5.
Figure 17:
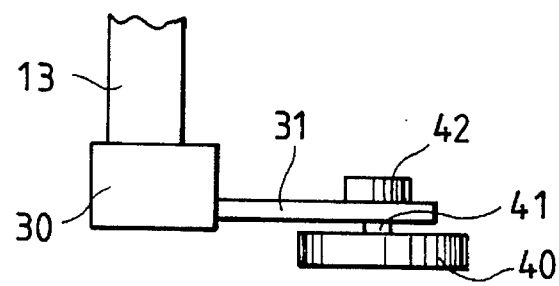
FIG. 17 is a side view of FIG. 16.

An embodiment of such means is shown in FIGS. 16 and 17. It is to be understood that FIG. 16 is a plan view of the bridging member and transfer device, FIG. 17 is a side view of FIG. 16, and in these drawings, reference characters identical to those in FIG. 1 designate identical or corresponding parts.

Referring to these drawings, a robot hand 30 is drive installed to the bottom end of the quill Z 13, constituting part of the transfer device 11. A hand 31 driven by the drive 30 and having two claws, also constitutes part of the transfer device 11. A bridging member body 40 is provided integrally with a grip 41 so that the bridging member body 40 can be held by means of the hand 31. A stopper 42 is designed to prevent the grip 41 of the bridging member body 40 from dropping when it is held by the hand 31, constituting the bridging member together with the bridging member body 40 and the grip 41.

Operation will now be described, starting at the fitting of the bridging member to the core 5. Namely, the required bridging member is selected from among those arranged in the bridging member stocker 19, the drive 30 is run, the grip 41 of the bridging member body 40 is held by the hand 31, the bottom surface of the bridging member body 40 is dipped in the adhesive bath 18, and the bridging member is transferred to the predetermined location of the core 5 and fitted.

Figure 18:
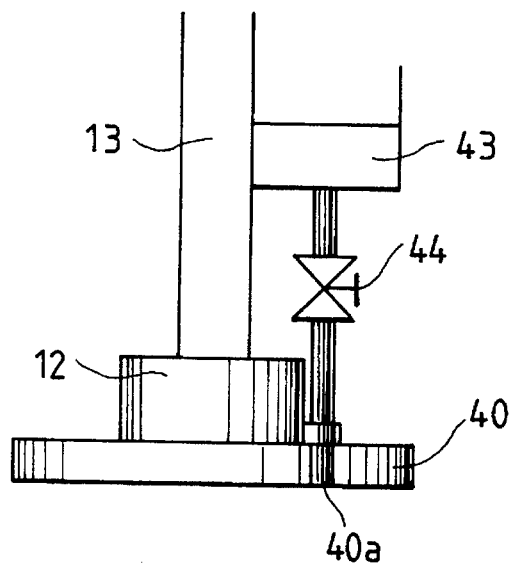
FIG. 18 is a diagram illustrating an adhesive application device concerned with Embodiment 6.
Figure 19:
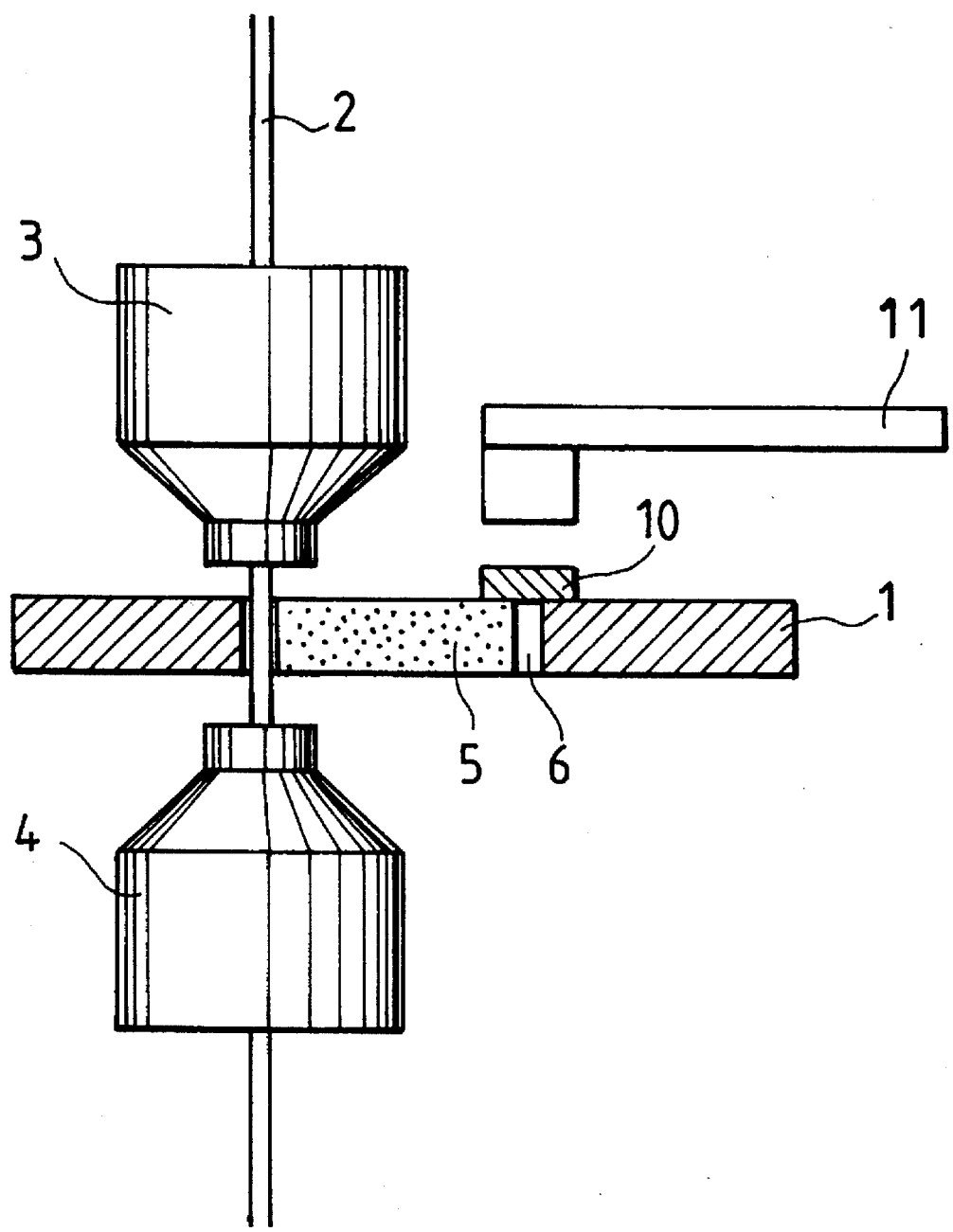
FIG. 19 is a diagram illustrating a conventional wire-cut electrical discharge machining apparatus.

While the bridging member was dipped in the previous bath 18 in each of the previous embodiments, the adhesive may be applied to the bridging member using other methods. In FIG. 18, reference characters identical to those in FIG. 1 indicate identical or corresponding parts, wherein 45 designates a bridging member made of a ferromagnetic material, 45a denotes a through hole drilled in the bridging member 45, 43 represents an adhesive bath installed on the quill Z, and 44 indicates an electromagnetic valve piped to the adhesive bath 43 and the through hole 45a to control the inflow of the adhesive. In operation, the bridging member 45 is attracted to and transferred by the electromagnet 12 and is set onto the core 5. Then, the electromagnetic valve 44 is opened to pour the adhesive into the bottom of the bridging member 45 through the through hole 45a of the bridging member 42, and the bridging member 45 is bonded to the core 5 or the bridging member 45 is bonded to the core 5 and the workpiece 1.

While a bridging member having a square-shape, a triangular-shape and the like is employed in the above described embodiments, a member which is made of an adhesive agent in a semi-hardened state may be employed as a bridging member.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A wire-cut electrical discharge machining method wherein bridging members are disposed by a bridging device across a workpiece and a core formed by cutting said workpiece into a contour shape using a wire electrode passed between an upper wire guide and a lower wire guide, said core being held by said bridging members, and subsequently a portion left for cutting is machined, said method comprising the steps of:

calculating the weight of said core;

calculating values defining the shape of said core;

selecting from the results of said calculations at least one of the shape, number and arrangement positions of said bridging members required to machine the left-for-cutting portion of said core and required to hold said core to substantially maintain an original positional relationship when the left-for-cutting portion of said core is machined;

placing said selected bridging members across said core and said workpiece and clear of said left-for-cutting portion before said left-for-cutting portion is machined;

machining the left-for-cutting portion of said core;

judging interference between the bridging member and the upper nozzle; and moving the upper nozzle to a non-interference position if it has been determined in said judgment that interference will occur.

2. The wire-cut electrical discharge machining method as defined in claim 1, further comprising the steps of:

machining the core up to finishing until its left-for-cutting portion remains; and after said placing step, machining said left-for-cutting portion of the core up to finishing.

3. The wire-cut electrical discharge machining method as defined in claim 1, further comprising the steps of:

machining the core up to finishing until its left-for-cutting portion remains; and after said placing step, machining said left-for-cutting portion of the core up to finishing.

4. A wire-cut electrical discharge machining method wherein a bridging member is disposed by a bridging device on a core formed by cutting said workpiece into a contour shape using a wire electrode passed between an upper wire guide and a lower wire guide, said core being held by said bridging device via said bridging member, and subsequently a portion left for cutting is machined, said method comprising the steps of:

calculating the weight of said core;

calculating values defining the shape of said core;

selecting from the results of said calculations at least one of the shape, number and arrangement positions of the bridging members required to hold said core to substantially maintain an original positional relationship when said left-for-cutting portion is machined;

placing said selected bridging member on said core by said bridging device before said left-for-cutting portion is machined;

holding said core by means of said bridging device via said bridging member and subsequently machining said left-for-cutting portion;

judging interference between the bridging member and the upper nozzle; and moving the upper nozzle to a non-interference position if it has been determined in said judgment that interference will occur.

5. The wire-cut electrical discharge machining method as defined in claim 4, further comprising the steps of:

machining the core up to finishing until its left-for-cutting portion remains; and after said placing step, machining said left-for-cutting portion of the core up to finishing.

6. A wire-cut electrical discharge machining method wherein a bridging member is disposed by a bridging device across one workpiece and a plurality of cores formed by cutting said workpiece into a contour shape using a wire electrode passed between an upper wire guide and a lower wire guide, said cores are held by said bridging member, and subsequently portions left for cutting are machined, said method comprising the steps of:

machining said workpiece to form a plurality of cores in said workpiece until respective left-for-cutting portions left;

calculating the weight of each of said cores;

calculating values defining the shape of each of said cores;

selecting from the results of said calculations at least the shape and arrangement position of said bridging member required to machine said left-for-cutting portion of each core and required to hold said cores to substantially maintain an original positional relationship when the left-for-cutting portion of each core is machined;

placing said selected bridging member across said one workpiece and each core machined with the left-for-cutting portion left and clear of the left-for-cutting portions;

subsequently machining the left-for cutting portion of each core;

judging interference between the bridging member and the upper nozzle; and moving the upper nozzle to a non-interference position if it has been determined in said judgment that interference will occur.

7. The wire-cut electrical discharge machining method as defined in claim 6, further comprising the steps of:

machining the core up to finishing until its left-for-cutting portion remains; and after said placing step, machining said left-for-cutting portion of the core up to finishing.

8. A wire-cut electrical discharge machining method wherein a bridging member is disposed by a bridging device across one workpiece and a plurality of cores formed by cutting said workpiece into a contour shape using a wire electrode passed between an upper wire guide and a lower wire guide, said cores being held by said bridging member, and subsequently portions left for cutting are machined, said method comprising the steps of:

calculating the weight of each of said cores;

calculating values defining the shape of each of said cores;

selecting from the results of said calculations at least the shape and arrangement position of said bridging member required to machine the left-for-cutting portion of each core and required to hold said cores to substantially maintain an original positional relationship when the left-for-cutting portion of each core is machined;

judging whether or not said selected bridging member interferes with the machined groove of the adjacent core when said bridging member is fitted across said core and said workpiece;

repeating said selecting step and judging step until it is judged that no interference will occur if it has been determined in said judgment that interference will occur;

machining said workpiece to form the cores for which machined grooves adjacent said bridging member do not interfere with said bridging member, until their left-for-cutting portions remain;

placing said selected bridging member across said cores and said workpiece and clear of said left-for-cutting portions; and machining said left-for-cutting portion of each core.

9. The wire-cut electrical discharge machining method as defined in claim 8, further comprising the steps of:

judging interference between the bridging member and the upper nozzle; and moving the upper nozzle to a non-interference position if it has been determined in said judgment that interference will occur.

10. The wire-cut electrical discharge machining method as defined in claim 8, further comprising the steps of:

machining the core up to finishing until its left-for-cutting portion remains; and after said placing step, machining said left-for-cutting portion of the core up to finishing.

11. A wire-cut electrical discharge machining apparatus wherein bridging members are disposed by a bridging device across a workpiece and a core formed by a cutting said workpiece into a contour shape using a wire electrode passed between an upper wire guide and a lower wire guide, said core is held by said bridging members, and subsequently a portion left for cutting a machined, said apparatus comprising:

first means for calculating the weight of the core to be cut off;

second means for calculating values of parameters defining the shape of said core;

means for selecting from the calculation results of said first and second calculating means at least one of the shape, number and arrangement positions of the bridging members required to machine the left-for-cutting portion of the core and required to hold said core to practically keep an original positional relationship when the left-for-cutting portion of the core is machined;

means for controlling said bridging device so that said bridging members selected by said selecting means are disposed across said core and said workpiece and clear of said left-for-cutting portion before said left-for-cutting portion is machined;

means for judging interference between said bridging member and said upper nozzle; and means for moving the upper nozzle to a non-interference position if it has been determined in said judgment that interference will occur.

12. The wire-cut electrical discharge machining apparatus as defined in claim 11, further comprising:

means for machining the core up to finishing with its left-for-cutting portion left; and means for machining the left-for-cutting portion of the core up to finishing.

13. The wire-cut electrical discharge machining apparatus as defined in claim 11, further comprising:

means for machining the core up to finishing with its left-for-cutting portion left; and means for machining the left-for-cutting portion of the core up to finishing.

14. A wire-cut electrical discharge machining apparatus wherein a bridging member is disposed by a bridging device on a core formed by cutting said workpiece into a contour shape using a wire electrode passed between an upper wire guide and a lower wire guide, said core being held by said bridging device via said bridging member, and subsequently a portion left for cutting is machined, said apparatus comprising:

first means for calculating the weight of a core to be cut;

second means for calculating parameters related to the shape of said core;

means for selecting from said calculation results of said first and second calculating means at least one of the shape, number and arrangement positions of the bridging members required to hold said core to substantially maintain an original positional relationship when said left-for-cutting portion of said core is machined;

means for controlling said selected bridging device so that said bridging member selected by said selecting means is disposed on said core before said left-for-cutting portion is machined;

means for judging interference between said bridging member and said upper nozzle; and means for moving the upper nozzle to a non-interference position if it has been determined in said judgment that interference will occur.

15. The wire-cut electrical discharge machining apparatus as defined in claim 14, further comprising:

means for machining the core up to finishing with its left-for-cutting portion left; and means for machining the left-for-cutting portion of the core up to finishing.

16. A wire-cut electrical discharge machining apparatus wherein a bridging member is disposed by a bridging device across one workpiece and a plurality of cores formed by cutting said workpiece into a contour shape using a wire electrode passed between an upper wire guide and a lower wire guide, said cores being held by said bridging member, and subsequently portions left for cutting are machined, said apparatus comprising:

first means for calculating the weight of each of said cores;

second means for calculating the values of parameters defining the shape of each of said cores;

means for selecting from the results of said calculations by said first and second calculating means at least the shape and arrangement position of the bridging member required to machine said left-for-cutting portion of each core and required to hold said cores to substantially maintain an original positional relationship when said left-for-cutting portion of each core is machined;

means for controlling said bridging device so that said bridging member selected by said selecting means is disposed across said workpiece and each core machined with said left-for-cutting portion left and clear of said left-for-cutting portions;

means for judging interference between said bridging member and said upper nozzle; and means for moving the upper nozzle to a non-interference position if it has been determined in said judgment that interference will occur.

17. The wire-cut electrical discharge machining apparatus as defined in claim 16, further comprising:

means for machining the core up to finishing with its left-for-cutting portion left; and means for machining the left-for-cutting portion of the core up to finishing.

18. A wire-cut electrical discharge machining apparatus wherein a bridging member is disposed by a bridging device across one workpiece and a plurality of cores formed by cutting said workpiece into a contour shape using a wire electrode passed between an upper wire guide and a lower wire guide, said cores being held by said bridging member, and subsequently portions left for cutting are machined, said apparatus comprising:

first means for calculating the weight of each of said cores;

second means for calculating specifications related to the shape of each of said cores;

means for selecting from the results of said calculations by said first and second means at least the shape and arrangement position of the bridging member required to machine said left-for-cutting portion of each core and required to hold said cores to practically keep an original positional relationship when said left-for-cutting portion of each core is machined;

means for judging whether or not said selected bridging member interferes with the machined groove of the adjacent core when said bridging member is fitted across said core and said workpiece;

means for repeating said selecting step and judging step until it is judged that no interference will occur if it has been determined in said judgment that interference will occur; and means for controlling said bridging device so that after the cores of which machined grooves adjacent the bridging member do not interfere with the bridging member have been machined with their left-for-cutting portions left, said selected bridging member is disposed across said cores and the workpiece and clear of the left-for-cutting portions.

19. The wire-cut electrical discharge machining apparatus as defined in claim 18, further comprising:

means for judging interference between said bridging member and said upper nozzle; and means for moving the upper nozzle to a non-interference position if it has been determined in said judgment that interference will occur.

20. The wire-cut electrical discharge machining apparatus as defined in claim 18, further comprising:

means for machining the core up to finishing with its left-for-cutting portion left; and means for machining the left-for-cutting portion of the core up to finishing.

* * * * *